United States Patent [19]

Stadler

[11] Patent Number: 4,899,276
[45] Date of Patent: Feb. 6, 1990

[54] FIELD-DIRECTED SCREEN HELP TECHNIQUE

[75] Inventor: Fred Stadler, Tarrant County, Tex.

[73] Assignee: International Business Machines Corporation, Armonk, N.Y.

[21] Appl. No.: 640,743

[22] Filed: Aug. 14, 1984

[51] Int. Cl.$^4$ ............................................... G06F 3/14
[52] U.S. Cl. ..................................... 364/300; 340/721
[58] Field of Search ....................... 340/721, 734, 745; 364/200 MS FILE, 900 MS FILE

[56] References Cited

U.S. PATENT DOCUMENTS

| | | | |
|---|---|---|---|
| 4,291,198 | 9/1981 | Anderson et al. | 364/900 X |
| 4,310,839 | 1/1982 | Schwerdt | 340/709 X |
| 4,481,603 | 11/1984 | McCaskill et al. | 364/900 |
| 4,555,775 | 11/1985 | Pike | 364/900 |
| 4,556,954 | 12/1985 | Advani et al. | 364/900 |
| 4,559,533 | 12/1985 | Bass et al. | 340/721 X |

OTHER PUBLICATIONS

Duff, Charles; Introducing the Macintosh–Chapter 15; McGraw-Hill, 1984; pp. 121–130.

*Primary Examiner*—D. L. Clark
*Attorney, Agent, or Firm*—Whitham & Marhoefer

[57] ABSTRACT

A field-directed screen help technique for a data entry system responds to a user request for help by overwriting a portion of the data entry screen with explanatory text that relates to the field the user is currently entering. The explanatory text may overlay other fields on the screen but leaves the related field area in view. The explanatory text is highlighted and linked to the data entry field so that the user can see the explanatory text in the context of the field. The explanatory text disappears when the user presses a response key.

3 Claims, 3 Drawing Sheets

VARD  03-07-84
15:28:44

VARIABLE DEFINITION

VARIABLE NAME         ANALOG              TYPE (AI, DO, DI, TI)      AI

SERIES SIX CPU ID     1                   SERIES SIX REGISTER NUM.   55

HIGH ALARM LIMIT      980                 ENGINEERING UNITS          [DEGF]

HIGH WARNING LIMIT    900                 SQUARE ROOT? (Y/N)         N

LOW WARNING LIMIT     150                 LINEAR CONVERSION? (Y/N)   N

LOW ALARM LIMIT       100                 ZERO IN ENG. UNITS         0

RATE OF CHANGE LIMIT  25                  FULL SCALE IN ENG. UNITS   0

ALARM DEAD BAND       10

MESSAGES --- FILL IN EACH VALUE AND PRESS ⟶; THEN F3 TO SAVE .

F1 = HELP   F2 = QUIT   F3 = SAVE   F4 = REMOVE   F6 = RESET   F9/10 = STEP

FIG. 1

VARD | 03-07-84
| 15:30:04

VARIABLE DEFINITION

| VARIABLE NAME | ANALOG | TYPE (AI, DO, DI, TI) | AI |

SERIES SIX CPU ID    1         SERIES SIX REGISTER NUM.    55

HIGH ALARM LIMIT     980       ENGINEERING UNITS    [DEGF]
HIGH WARNING LIMIT   900
LOW WARNING LIMIT    150       ┌─────────────────────────────────────────┐
LOW ALARM LIMIT      100       │ THIS FIELD LETS YOU ASSIGN A DESCRIPTION │
RATE OF CHANGE LIMIT 25        │ OF THE UNITS FOR THE VARIABLE.          │
ALARM DEAD BAND      10        │ THE DESCRIPTION IS DISPLAYED WITH THE VALUE │
                               │ OF THE VARIABLE WHEN THE VARIABLE APPEARS │
                               │ ON AN OPERATIONAL DISPLAY. FOR EXAMPLE, │
                               │ IF ENTER THIS FIELD AS PSI, THEN A VALUE OF 234 │
                               │ IS DISPLAYED AS 234 PSI.                │
                               └─────────────────────────────────────────┘

MESSAGES — FILL IN EACH VALUE AND PRESS ⏎ ; THEN F3 TO SAVE.

F1 = HELP    F2 = QUIT    F3 = SAVE    F4 = REMOVE    F6 = RESET    F9/10 = STEP

FIG. 2

FIELD-DIRECTED SCREEN HELP TECHNIQUE

BACKGROUND OF THE INVENTION

The invention generally relates to data entry systems of the type employing a keyboard or other data entry user interface and a display screen such as a cathode ray tube (CRT) or similar display for displaying data entered by the user. More particularly, the invention is directed to a screen help technique to assist the user in the correct entry of data. A typical data entry system in which the technique according to the invention can be advantageously used ranges from small, self-contained microcomputer systems generally referred to a personal computers to large main-frame systems having a plurality of terminals. Virtually any type of data entry system where accurate, rapid entry of data by personnel having little or no training is improved by the use of the technique according to the invention.

Conventionally, a data entry system is designed to display a "screen" or "menu" having a plurality of data entry labels or categories with blanks immediately adjacent each data entry label or category. It is in these blanks where the user is required to enter the corresponding data. The blanks may be delineated by an underline or some other demarcation to show the user where the data is going by category. The blanks have a predefined length in terms of the number of characters that can be accepted by the system for the corresponding categories, and the underlining or other demarcation would also serve the purpose of showing the length as well as the location of the data required. Such "screens" or "menus" can be generated by a screen generator which is a computer program written specifically for that purpose. Those skilled in the art will also know that a screen generator program can be written from scratch very simply by using BASIC or other suitable computer programming languages. A characteristic of the "screens" or "menus" which are produced for data entry purposes is that the cursor which is displayed on the screen can only be placed in one of the designated blanks and no where else on the screen. Thus, data entry is limited to predefined areas on the screen, and these areas themselves provide the interface with the data entry program which is requesting the data. In other words, the user is relieved of the burden of telling the data entry program what category of data is being entered since the data entry program will recognize the category by the location on the screen in which the data is entered.

Obviously, the data entry system just described is a very good one in that it is simple and easy to use. In those cases where the type of data is straight forward and fairly routine such as would be encountered in motor vehicle statistics and employee records, it takes very little time for a user to become proficient in making data entries. In those cases where the user is just learning the system, help can be provided by a manual. It is also known to provide a special "help" key or command for the user to call up a "help" screen or menu if s/he is uncertain about the entry of certain data. Typically, such a menu obstructs all or at least part of the data entry screen and provides a set of instructions or explanations which merely repeat those which would be found in the manual. This procedure has the advantage of allowing the user quick reference to instructions or explanations without having to fumble through the manual.

There are certain situations, however, where the data entry is not routine. For example, if the user does not regularly use the data entry system, it may take the user some time to remember the data entry procedure and the quality and quantity of data required by the system. Obviously, the display of a full or partial screen menu of "help" instructions or explanations will save some time for the user by avoiding the time spent leafing through a manual. But the user will still have to study the information presented and make some judgements as to how those instructions or explanations apply to their situation. In another example, the data entry system may be used for purposes of configuring a control program for a particular application. An example of such a system is disclosed in U.S. Pat. No. 4,644,478, filed Sept. 13, 1983, by Lawrence Keith Stephens and Robert B. Hayes for "Monitoring and Alarm System for Custom Applications", and assigned to the assignee of this application. Especially in this type of situation, the data entered is unique to the particular application and, although the data entry screen is designed to promote ease of data entry, the user may at times need better quality help than is provided by manuals or help screens.

SUMMARY OF THE INVENTION

It is therefore an object of the present invention to provide a screen help technique which provides the user with significantly better assistance in making data entries than is possible with help screens that have been heretofore used in data entry systems.

It is another object of the invention to provide a screen help technique for data entry systems in which the guidance provided is relevant to the particular field or blank of the data entry screen about which the user has questions.

According to the present invention, when the user presses the "help" key, a portion of the data entry screen is overwritten with explanatory text that relates to the field that the user is currently entering. The explanatory text may overlay other fields on the screen but not the related field area for which help is requested. The explanatory text is surrounded by lines that form a box or "window" and is related to the corresponding input field with a line from the box to the field. This lets the user see the explanatory text in the context of the field. The explanatory text disappears when the user presses any key.

DESCRIPTION OF THE DRAWINGS

The foregoing and other objects, advantages and aspects of the invention will be better understood from the following detailed,. description of the invention with reference to the drawings, in which:

FIG. 1 is a sample data entry screen before the user presses the "help" key;

FIG. 2 is the sample data entry screen shown in FIG. 1 after the, user presses the "help" key showing the field-directed "help window" provided according to the invention;

DETAILED DESCRIPTION OF THE INVENTION

Figure 3:
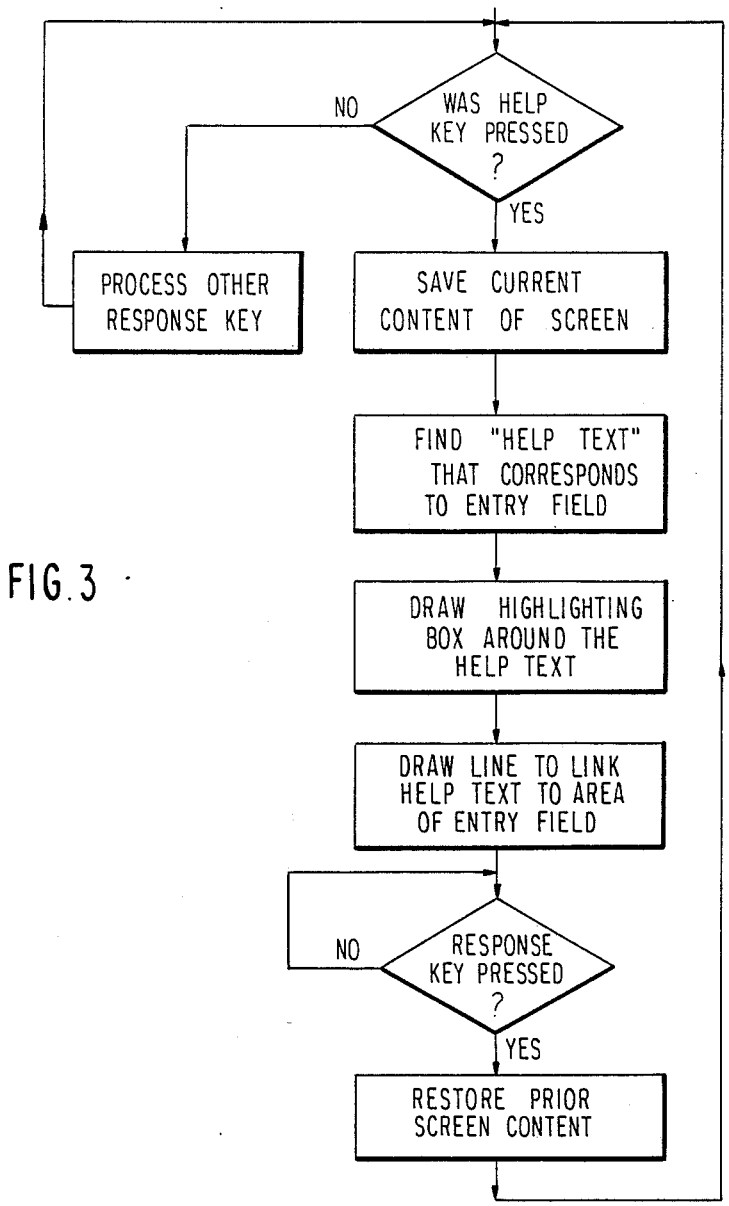
FIG. 3 is a flow diagram of the field-directed screen help technique according to the invention.

Referring now to the drawings and more particularly to FIG. 1, there is shown a sample data entry screen which has a plurality of labels such as "High Alarm Limit", "Low Warning Limit" and so forth. Adjacent each of the labels is a field which, prior to data entry, is blank. In the sample data entry screen shown in FIG. 1, the fields all contain data such as "980" for the "High Alarm Limit" label and "150" for the "Low Warning Limit". Some of these fields may have default values which are automatically entered in the data entry screen but which may be changed by the user. The particular screen shown is one which might typically be used in the system disclosed in the aforementioned application Ser. No. 531,650 of Stephens et al. When using this or similar type of data entry screen, the user typically is presented with the screen with all fields blank and the cursor in the first blank field which serves to prompt the user to enter data required for the corresponding label. The user enters the data and goes on to the next field and repeats the process. Generally, the cursor automatically goes to the next field when all the character spaces have been filled in one field or, if less than all the character spaces are required, when the user presses the ENTER key or other cursor movement key. When all fields have been filled, the next data entry screen may be automatically displayed or the user might be required to press a SAVE key before the data entered into the several fields is saved and the next data entry screen is displayed. The latter option of course gives the user an opportunity to review the data entered before it is saved. It will be observed that at the bottom of the sample data entry screen shown in FIG. 1 there is a message to "Fill in each value and press ←; then F3 to save." The symbol ← is used for the carriage return or ENTER key on most computer keyboards. The function key F3 has been defined in this system as the SAVE key.

It will also be observed at the bottom of the sample data entry screen shown in FIG. 1 there is a last line that defines several of the function keys. The function key of particular interest in the context of the present invention is the F1 key, which is defined as the "help" key. The provision of such a "help" key is of course old in the art. However, when the F1 or "help" key is pressed by the user in a data entry system which incorporates the screen help technique according to the present invention, the result is like that shown in FIG. 2. Note that in FIG. 1 the cursor represented by a one character underline is beneath the "D" in the field corresponding to the label "Engineering Units". When the user pressed the F1 key, a "window" appeared as shown in FIG. 2 which provides an explanation that is specifically directed to the field in which the cursor is located. This window is outlined by a box from which there is a line that points to the field in question thereby providing a clear visual correlation of the explanatory text in the context of the field in question. Moreover, while the "window" overlays a portion of the data entry screen, it does not overlay or obscure the field or its label where the user is currently entering data. When the user presses any key as when making a data entry, the "window" with its explanatory text automatically disappears. Alternatively, the "window" and its explanatory text may be retained on the screen until the data for that field has been entered and the user presses the ENTER key at which point the "window" with its explanatory text would automatically disappear.

The essential elements of the invention are (1) that the help screen be related to the field of data being entered, (2) that the help text appear on the same screen, (3) that the help screen be clearly identified as relating to the field being entered, and (4) that the help text disappear when the user keys a response into the field. In the example shown in FIG. 2, the help text is surrounded by lines forming a box, but those skilled in the art will recognize that other forms of highlighting such as reverse video or color changes can be substituted.

The program which implements the field-directed screen help technique is illustrated in the flow diagram shown in FIG. 3. This program constantly monitors the "help" key, recycling until that key is pressed by the user. When the "help" key is pressed, the first thing that happens is that the current content of the screen is saved. Then, by determining the field wherein the cursor is currently located, the program calls from memory the "help text" that corresponds to that field. The "help text" is displayed on the data entry screen at a location that does not obscure the field being entered, and a highlighting box is drawn around the "help text". A line is then drawn from the box to the field being entered in order to link the "help text" to that data entry field. The program then waits until a response key is pressed. This may be any key or, as previously mentioned, it may be the ENTER key. When the response key is pressed, the prior screen content is restored thereby automatically removing the "help text", its highlighting box and the linking line from the display.

The program illustrated by the flow diagram shown in FIG. 3 is further described by a program design language (PDL) following the procedures set forth by P. Van Leer, "Top-down Development Using a Program Design Language," *IBM System Journal*, no. 2, 1976, pages 155 to 170, as follows:

Process keyboard input
    PERFORM UNTIL end-key pressed
    IF help-key pressed
    THEN Help screen routine
    ELSE Process non-help key input
    ENDIF
    ENDLOOP
Help screen routine
    SAVE current content of screen in save area
    SAVE current cursor postion
    OPEN file of help text (or reset pointer to start of text)
    PERFORM UNTIL help text found that matches field READ next help text
    ENDLOOP
    WRITE matching text onto display screen
    HIGHLIGHT help text (surround with a box; display reverse video; etc.)
    CASE entry-field location relative to help text OF
    above: Draw vertical line from entry field to help text
    below: Draw vertical line from help text to entry field
    left: Draw horizontal line from entry field to help text
    right: Draw horizontal line from help text to entry field
    ENDCASE
    RESET cursor to prior location on screen
    WAIT for next keyboard input
    RESTORE prior screen contents (wipe out help text)
    RETURN

I claim:

1. In a data entry system which employs data entry screens and a save area for saving data describing a current data entry screen, said data entry screens comprising a plurality of fields in which a user enters data, corresponding labels identifying the fields, and a label identifying a current data entry field in which the user is next to enter data, said system storing help text associated with each data entry field label, a field-directed screen help technique comprising the steps of:

- monitoring an input from the user requesting help,
- when a request for help is detected, saving the data describing the current data entry screen in the save area,
- using the current data entry field label, determining the current data entry field and the help text for that data entry field,
- displaying the help text on the current data entry screen at a location which obscures part of the data entry screen but not the current data entry field,
- drawing a box around the help text and drawing a line from the box to the current data entry field to link the help text to the current data entry field on the data entry screen, and
- restoring the prior data entry screen by reading the data entry screen in the save area to the screen when the user presses a response key.

2. The field-directed screen help technique according to claim 1 wherein the location of a cursor in a data entry field on the data entry screen is employed to point to the current data entry field label.

3. The field-directed screen help technique according to claim 1 wherein the step of restoring is performed in response to the pressing by the user of any key.

* * * * *